United States Patent
Bakker et al.

(10) Patent No.: US 9,650,694 B2
(45) Date of Patent: May 16, 2017

(54) TREATMENT OF HIGH SULPHUR SOLIDS

(71) Applicant: GLENCORE TECHNOLOGY PTY LIMITED, Brisbane, Queensland (AU)

(72) Inventors: Martin Lluis Olaf Paul Bakker, Upper Kedron (AU); Alistair Stewart Burrows, Oxley (AU)

(73) Assignee: Glencore Technology Pty Limited, Brisbane (AU)

( * ) Notice: Subject to any disclaimer, the term of this patent is extended or adjusted under 35 U.S.C. 154(b) by 0 days.

(21) Appl. No.: 14/912,912

(22) PCT Filed: Aug. 19, 2014

(86) PCT No.: PCT/AU2014/050191
§ 371 (c)(1),
(2) Date: Feb. 18, 2016

(87) PCT Pub. No.: WO2015/024073
PCT Pub. Date: Feb. 26, 2015

(65) Prior Publication Data
US 2016/0201160 A1    Jul. 14, 2016

(30) Foreign Application Priority Data

Aug. 19, 2013 (AU) ................ 2013903136

(51) Int. Cl.
| | | |
|---|---|---|
| *C22B 13/02* | (2006.01) | |
| *C22B 13/06* | (2006.01) | |
| *C22B 7/04* | (2006.01) | |
| *C01G 21/02* | (2006.01) | |

(52) U.S. Cl.
CPC .............. *C22B 13/06* (2013.01); *C01G 21/02* (2013.01); *C22B 7/04* (2013.01); *C22B 13/02* (2013.01)

(58) Field of Classification Search
CPC ........... C22B 7/04; C22B 13/06; C22B 13/02; C01B 17/45; C01G 21/02
See application file for complete search history.

(56) References Cited

U.S. PATENT DOCUMENTS

| | | | | |
|---|---|---|---|---|
| 4,135,912 A | * | 1/1979 | Matthew ............... | C22B 11/021 75/10.29 |
| 5,467,365 A | * | 11/1995 | Bied-Charreton ...... | C22B 13/02 373/109 |
| 2008/0250900 A1 | * | 10/2008 | Arthur ..................... | C22B 7/04 75/10.35 |

FOREIGN PATENT DOCUMENTS

| | | |
|---|---|---|
| BG | 1618 U1 * | 10/2012 |
| WO | WO 91/08317 A1 | 6/1991 |
| WO | WO 2011/076995 A1 | 6/2011 |

OTHER PUBLICATIONS

Nikola, Kutev et al. BG 1618 U1. Oct. 31, 2012. Abstract.*
International Search Report and Written Opinion, PCT/AU2014/050191, mailed Nov. 13, 2014.
Errington, Bill et al., "The ISA-YMG Lead Smelting Process," Xstrata Technology, PbZn 2005 Conference, Kyoto, Japan.

* cited by examiner

*Primary Examiner* — George Wyszomierski
*Assistant Examiner* — Tima M McGuthry Banks
(74) *Attorney, Agent, or Firm* — Winston & Strawn LLP

(57) ABSTRACT

A process of treating a solid material containing lead and elemental sulphur, by feeding the solid material to a furnace containing a bath of molten slag under conditions such that elemental sulphur burns in the furnace to form sulphur dioxide and lead in the solid material is oxidized and reports to the slag, then removing a gas stream containing sulphur dioxide from the furnace, and finally removing a lead-containing slag from the furnace.

24 Claims, No Drawings

TREATMENT OF HIGH SULPHUR SOLIDS

This application is a 371 filing of International Patent Application PCT/AU2014/050191 filed Aug. 19, 2014, which claims priority to Australian application no. 2013903136 filed Aug. 19, 2013.

TECHNICAL FIELD

The present invention relates to a process for treating high sulphur solids. More specifically, the present invention relates to a process for treating solids containing lead and high levels of elemental sulphur.

BACKGROUND ART

Some modern processes for recovering lead from sulphide ores and concentrates include the Kivcet process, the QSL process, the SKS process and the ISASMELT™ process. Part of the world's primary lead production is made using these processes, and part is made from the conventional flowsheet of a sinter plant and blast furnace.

The ISASMELT™ process utilises gas injection into melts via a top entry submerged lance. Injection of gases via the top entry submerged lance produces a very turbulent bath in which high intensity smelting or reduction reactions take place. In the ISASMELT™ process, a two stage process may be utilised. In the two stage process, lead concentrate is added directly to a molten slag bath in a smelting furnace. This produces a lead containing slag, which is transferred to a second furnace in which that lead containing slag is reduced to form lead bullion. Both furnaces use top entry submerged lances for injection of gases.

The ISASMELT™ process can also be used to directly reduce some of the concentrate added to the smelting furnace to lead bullion. Typically, concentrates containing high levels of lead, such as between 55% to 80%, but more preferably between 60% to 75% have been processed in this manner, although concentrates having lead concentrations outside this range may also be processed using direct smelting.

In the production of zinc, zinc containing ores and concentrates can be subjected to a leaching process in order to solubilise zinc values. The dissolved zinc is separated from the leach residue and the pregnant leach liquor containing dissolved zinc is treated to recover zinc.

The Albion Process™ is an oxidative leaching process that can be used to treat zinc sulphide ores and concentrates. Zinc sulphide ores and concentrates normally also contain lead. Following the leaching step in the Albion Process™, a solid residue is recovered which contains lead (typically in the form of lead compounds, especially lead sulphide and lead sulphate) and high amounts of elemental sulphur. For example, the leach residue may contain from 15 to 25% lead and at least 30% elemental sulphur, for example, from 40 to 60% elemental sulphur. Other leaching processes may also result in the formation of leach residues containing lead and high levels of elemental sulphur. Some silver may also be present in the leach residue.

Solid residues containing such high levels of elemental sulphur have proven to be difficult to process. These residues have a very different chemical composition to the lead sulphide concentrates that are normally processed to produce lead. Due to the difficulties in processing solid residues containing such high levels of elemental sulphur, the solid residues have, up to now, lacked an effective treatment route, and have been stored in tailings dams or tailings piles.

It will be clearly understood that, if a prior art publication is referred to herein, this reference does not constitute an admission that the publication forms part of the common general knowledge in the art in Australia or in any other country.

Throughout this specification, the word "comprising" and its grammatical equivalents shall be taken to have an inclusive meaning unless the context of use indicate otherwise

SUMMARY OF INVENTION

The present invention is directed to a process for treating high sulphur solids, which may at least partially overcome at least one of the abovementioned disadvantages or provide the consumer with a useful commercial choice.

With the foregoing in view, the present invention in one form, resides broadly in a process for treating a solid material containing lead and elemental sulphur, the process comprising feeding the solid material to a furnace containing a bath of molten slag under conditions such that elemental sulphur burns in the furnace to form sulphur dioxide and lead in the solid material is oxidised and reports to the slag, removing a gas stream containing sulphur dioxide from the furnace, and removing a lead-containing slag from the furnace.

In some embodiments, the sulphur predominantly burns within the bath of molten slag.

Desirably, the furnace is operated under oxidising conditions such that lead compounds in the solid material become oxidised and report to the slag. The lead compounds in the solid material are believed to be predominantly in the form of lead sulphide and lead sulphate. The lead compounds are suitably oxidised to lead oxide.

DETAILED DESCRIPTION OF THE INVENTION

In one embodiment, the solid material contains high levels of elemental sulphur. For example, the content of elemental sulphur in the solid material may comprise greater than 30% by weight, or from 30 to 60% by weight, or from 40 to 60% by weight, or from 45 to 58% by weight. Solid materials, such as leach residues, that contain such high levels of elemental sulphur, have proven to be difficult to process prior to development of the present invention.

In some embodiments, the furnace comprises a top entry submerged lance furnace. Such a furnace may comprise a furnace as sold by the present applicant under the trademark ISASMELT™ Such furnaces are well-known to persons skilled in the art and need not be described further at this stage. The end of the lance is suitably submerged below the upper level of the bath during operation of the process of the present invention.

During operation of the process of the present invention, it is expected that some of the lead in the solid material that is supplied to the furnace will fume and exit the furnace in the gas stream. Therefore, in some embodiments, the gas stream leaving the furnace may be treated to recover lead fume therefrom. The lead fume may be recovered from the gas stream leaving the furnace using any conventional technology known to be suitable to the person skilled in the art. For example, the gas stream leaving the furnace may be allowed to cool (or may be forced cooled) so that the lead fume solidifies and the solidified lead fume may then be removed using gas/solid separation technology, such as filters, bag houses, or electrostatic precipitators.

Any lead fume that is recovered from the gas stream may be returned to the furnace to improve the recovery of lead. The lead fume will typically be in the form of a lead-containing dust and the lead-containing dust may be subject to an agglomeration step prior to returning it to the furnace.

The gas stream may also be treated to separate sulphur dioxide therefrom. In one embodiment, the gas stream may be treated to convert the sulphur dioxide to sulphuric acid, with the sulphuric acid being recovered either for use in another process or for sale. In other environments, sulphur dioxide may be removed from the gas stream using wet scrubbing, spray dry scrubbing, SNOX flue gas desulphurisation or dry sorbent injection. Other processes for removing sulphur dioxide from gas streams may also be used in the present invention.

In some embodiments of the present invention, the gas stream leaving the furnace is subjected to removal of lead fume, followed by removal of sulphur dioxide.

Once the gas stream has been treated to remove lead fume and sulphur dioxide, the gas stream may be vented to stack. If required, further treatment of the gas stream may be undertaken prior to venting the gas stream to the atmosphere.

As mentioned above, the solid material that is fed to the furnace may comprise a solid material having a high content of elemental sulphur. The solid material may comprise a leach residue, for example, such as a leach residue obtained from a zinc leaching process.

The solid material supplied to the furnace also contains lead. The solid material provided to the furnace may have a lead content of from 5 to 40% by weight, or from 10 to 35% by weight, or from 15 to 30% by weight.

In some embodiments, the solid material supplied to the furnace comprises a leach residue. In other embodiments, the solid material supplied to the furnace comprises a blend of one or more leach residues with a lead concentrate and/or a lead slag.

The solid material that is supplied to the furnace may also comprise silver. In some embodiments, the solid material may have a silver content in the range of 150 to 30000 ppm.

The solid material that is supplied to the furnace may have a moisture content of from 10 to 35% by weight, or from 15 to 35% by weight, or from 20 to 31% by weight.

Oxygen will normally be supplied to the furnace. The oxygen is required to combust with the elemental sulphur to form sulphur dioxide and also to oxidise lead compounds in the solid material to form oxidised lead compounds that report to the slag. If fuel is added to the furnace, oxygen is also required to burn the fuel. In some embodiments, oxygen is added to the furnace in an amount equivalent to 100 to 150% of the stoichiometric requirements of their reactions taking place in the furnace, more typically from 110% to 130% of stoichiometric requirements.

In some embodiments, one or more fluxes may be added to the furnace. The addition of and choice of fluxes to be added to the furnace may depend somewhat on the downstream processing requirements for the lead-containing slag that is produced in and removed from the furnace. In some embodiments, an iron flux and/or a limestone flux may be added to the furnace.

The furnace may be operated in a temperature range at which combustion of the sulphur dioxide takes place and formation of a lead-containing slag occurs. Typically, the furnace will be operated at a temperature such that the bath temperature in the furnace falls in the range of from 1000° C. to 1350° C., or from 1050° C. to 1300° C., or from 1080° C. to 1280° C., or from 1100° C. to 1250° C.

In embodiments where lead fume is recovered from the gas stream leaving the furnace in the form of a lead dust, it is expected that the lead dust will comprise a mixture of lead oxide and lead sulphate. The lead dust may have a lead content of 70 to 75% by weight. The lead dust may have a low zinc content, typically less than 0.5% by weight. The lead dust can be returned to the furnace. As mentioned above, it may be desirable to agglomerate the lead dust into larger particles prior to returning the lead dust to the furnace. This will minimise entrainment and removal of the returned lead dust before it has a chance to react in the furnace.

The furnace contains a bath of molten slag. The lead-containing components in the solid material supplied to the furnace become oxidised in the furnace and report to the slag. The slag may be removed from the furnace and subsequently treated to produce lead therefrom. Any process that can convert lead slag into lead bullion or lead metal can be used to treat the slag it has been recovered from the furnace.

The slag may be removed from the furnace by periodically tapping molten slag from the furnace.

The slag that is removed from the furnace may be subject to a granulation step or a casting step prior to further treatment to convert the slag into lead bullion or lead metal.

The process of the present invention may be operated as a continuous process. Alternatively, the process of the present invention may be operated as a batch process.

The slag that is formed in the process of the present invention will contain oxidised lead compounds, such as lead oxide and lead sulphate. The slag may also include calcium oxide, $SiO_2$ and oxides of iron. The flux may have an approximate composition of:

PbO 15-55%
CaO 1-15%
$SiO_2$ 20-30%
$Fe_2O_3$ 20-45%

In a second aspect, the present invention provides a method for treating a solid material containing high levels of elemental sulphur, the method comprising the steps of feeding the solid material to a furnace having a bath of molten slag, the bath of molten slag having a temperature of between 1000° C. and 1350° C., wherein elemental sulphur in the solid material burns in the furnace to form sulphur dioxide and lead in the solid material is oxidised to form oxidised lead compounds that report to the molten slag, removing a gas stream containing sulphur dioxide from the furnace and removing a lead-containing slag from the furnace.

In some embodiments of the second aspect of the present invention, oxygen or an oxygen containing gas (such as air) is also supplied to the furnace.

In some embodiments of the second aspect of the present invention, the furnace comprises a top entry submerged lance furnace.

During development of the present invention, the inventors believed that a likely outcome of feeding the solid material having a high content of elemental sulphur to the furnace was that the elemental sulphur in the feed would not combust in the bath/furnace, but rather would evaporate and burn in the upper furnace or gas of take, thus losing any fuel value associated with the sulphur. This would result in a high fuel requirement combined with very high offgas flue temperatures as the sulphur combustion occurred in the gas phase. Surprisingly, during test trials conducted by the present inventors, neither a high fuel requirement nor high offgas flue temperatures were observed. As a result, the present inventors have concluded that combustion of sulphur took place mainly in the slag bath. This outcome could not be predicted prior to conducting the test trials for the present invention.

In embodiments where a top entry submerged lance furnace is used in the process of the present invention, the present inventors also had concerns that uncontrollable foaming of the bath would occur if combustion of the elemental sulphur took place in the bath, it will be understood that combustion of the sulphur results in the generation of sulphur dioxide gas having a significantly greater volume than the elemental sulphur being supplied to the bath. Uncontrollable foaming of the bath in a top entry submerged lance furnace represents a very dangerous operating condition as it can lead to the molten bath contents foaming up and coming out of the top of the furnace. This is obviously very dangerous to operators of the plans and it is typically necessary to withdraw the lances and stop feeding the materials and oxygen to the bath if uncontrollable foaming should occur. Surprisingly, despite the test trials indicating that the bulk of sulphur dioxide combustion occurs in the bath, no uncontrollable foaming of the bath took place. A small amount of stable foam was generated in some instances.

Any of the features described herein can be combined in any combination with any one or more of the other features described herein within the scope of the invention.

EXAMPLES

A lead/zinc concentrate from the McArthur River mine in the Northern Territory, Australia, was subjected to an atmospheric leaching to remove the zinc horn the concentrate. A byproduct of the leach process is a solid residue containing lead and silver from the concentrate plus gangue materials and elemental sulphur. This solid material can contain a high level of elemental sulphur, typically between 50% and 60% by weight. This solid residue has proven to be difficult to process. Throughout the examples, this solid residue will be referred to as a "direct leaching residue" or a "DL residue".

Pilot plant trials were conducted using this solid material. The pilot plant trials were conducted in a pilot plant size ISASMELT® furnace. The first consists of a cylindrical furnace with an internal diameter of approximately 305 mm and a height of approximately 1.8 m. The vessel is lined with chrome-magnesite refractory bricks, followed by high alumina bricks and a kaowool lining to the shell. A mass flow control is used to inject natural gas, and air into the bath via a 29 mm inner diameter stainless steel lance. The solid material fed to the furnace is added in known amounts to a calibrated variable speed conveyor belt which drops the feed onto a vibrating feeder and then through a chute at the top of the furnace. Removal of molten products from the furnace can be achieved by opening the single taphole at the base of the furnace and collecting the materials in cast iron ladles. If necessary, the furnace can be tilted around its central axis to completely drain the furnace of its contents. The process off-gases pass through a drop-out box and an evaporative gas cooler, before being directed through a baghouse and a caustic soda scrubber, for removal of any dust and sulfur-containing gases, prior to venting to the stack. Bath temperature is measured continuously via a thermocouple, placed through the refractory lining of the furnace. Independent confirmation of the bath temperature is obtained using an optical pyrometer, a dip-tip measurement during tapping or a dip-tip measurement of the slag through the top of the furnace. The pilot furnace is initially heated and then held at temperature between tests by means of a gas burner located in the taphole.

In addition to the DL residue, other leach residues and/or lead concentrates may be added as part of a mixed solid material being fed to the pilot plant ISASMELT® furnace. For convenience, the other residues will be referred to as "residue 2" and "residue 3". Table 1 shows the range of feed materials provided for the pilot test work and the moisture contents of the as-received materials.

TABLE 1 feed materials used in the pilot testwork

| MATERIAL | % $H_2O$ as Received |
| --- | --- |
| Direct Leach (DL) Residue | 31.7 |
| Residue 2 | 22.97 |
| Residue 3 | 21.03 |
| Lead Concentrate | 8.17 |
| Iron Flux | 9.47 |
| Limestone Flux | 4.32 |

Table 2 shows the chemical composition of the lead-containing feed materials used in the pilot plant trials:

TABLE 2

Composition of feed materials

| Material | Composition (wt %) | | | | | | | | | |
| --- | --- | --- | --- | --- | --- | --- | --- | --- | --- | --- |
| | Pb | Cu | Fe | S | $SiO_2$ | CaO | Zn | Ag (ppm) | MgO | $Al_2O_3$ |
| DL Residue | 17.0 | 0.1 | 9.4 | 58.3 | 7.4 | 0.0 | 0.3 | 273 | 0.0 | 0.0 |
| Residue 2 | 13.3 | 0.6 | 11.2 | 7.5 | 28.0 | 3.2 | 9.7 | 964 | 2.0 | 3.0 |
| Residue 3 | 27.6 | 0.4 | 11.3 | 15.0 | 6.5 | 5.3 | 9.7 | 3980 | 1.0 | 2.0 |
| Lead Concentrate | 31.3 | 0.6 | 13.4 | 24.5 | 1.1 | 3.9 | 5.0 | 9000 | 0.6 | 1.5 |

In the actual pilot tests, it was found necessary to add iron flux or to add silicon flux.

The testwork proposal assumed the use of three different feed blends during the testwork to represent a base case (likely commercial operation) plus a low sulfur case and a high sulfur case. The proposed feed blends are shown in Table 3, while the calculated chemical compositions of the different feed blends are shown in Table 4. Table 5 shows the estimated species distribution for the three blends.

TABLE 3

Feed blends

| | BASE CASE | LOW S CASE | HIGH S CASE |
| --- | --- | --- | --- |
| D.L. Residue | 72% | 0.0% | 100% |
| Residue 2 | 11% | 39% | 0.0% |
| Residue 3 | 12% | 16% | 0.0% |
| Lead Concentrate | 5% | 45% | 0.0% |

TABLE 4 composition of feed blends

| Feed Blend | Pb | Cu | Fe | S | SiO2 | CaO | Zn | Ag (ppm) | MgO | Al2O3 |
|---|---|---|---|---|---|---|---|---|---|---|
| Base Case | 18.6 | 0.2 | 10.1 | 45.8 | 9.2 | 1.2 | 2.7 | 1230 | 0.4 | 0.6 |
| Low Sulphur | 23.7 | 0.6 | 12.2 | 16.4 | 12.5 | 3.9 | 7.6 | 5063 | 1.2 | 2.2 |
| High Sulphur | 17.0 | 0.1 | 9.4 | 68.3 | 7.4 | 0.0 | 0.3 | 273 | 0.0 | 0.0 |

TABLE 5

Assumed distribution of species in feed blends

| SPECIES | BASE CASE | LOW S CASE | HIGH S CASE |
|---|---|---|---|
| $PbSO_4$ | 24.9 | 14.1 | 24.9 |
| PbS | 1.8 | 16.3 | 0 |
| FeO | 3 | 7.2 | 0 |
| $FeS_2$ | 13.2 | 13 | 16.4 |
| $NaFe_3(SO_4)_2(OH)_6$ | 3.5 | 1.8 | 3.8 |
| $ZnO \cdot Fe_2O_3$ | 0.8 | 0 | 1.1 |
| $Cu_2S$ | 0 | 0.3 | 0 |
| $CuSO_4$ | 0.3 | 0.8 | 0 |
| ZnO | 0.7 | 1 | 0 |
| $ZnSO_4$ | 4.1 | 11.3 | 0 |
| ZnS | 0.4 | 3.4 | 0 |
| $SiO_2$ | 9.2 | 12.5 | 7.4 |
| CaO | 1.2 | 3.9 | 0 |
| $Al_2O_3$ | 0.6 | 2.2 | 0 |
| MgO | 0.4 | 1.2 | 0 |
| MnO | 0.7 | 5.5 | 0 |
| Ag | 0.123 | 0.5 | 0 |
| S | 34.6 | 4.1 | 46.4 |

A series of small scale (10 kg) experiments were carried out in order to determine the required feed preparation for each of the feed blends. The prepared feed was required to a moist, non-dusty agglomerate that would feed cleanly into the furnace without significant entrainment in the off as flows. In addition it was necessary that the feed was dry enough that it could be fed along a vibrating feeder without sticking. The following procedure was used.

10 kg of each mixed feed was prepared and added to a 25 liter plastic drum. If the mixture appeared too wet, then drying agents (flour or bio-char) were added to the mix. If the mixture appeared too dry, then water was added to the mix. The mix was the agglomerated by rolling the drum for approximately 30 rotations.

The results of the tests were as follows.
1. The Base Mix formed a reasonable, non-dusty agglomerate with no additions of water or drying agent.
2. The Low Sulfur mix required the addition of approximately 6% of water to the original 10 kg wet mix to form a suitable agglomerate.
3. The High Sulfur mix required the addition of 0.5 kg of drying agent (either flour or bio-char were found to be suitable) to form a reasonable agglomerate that would feed along the vibrating feeder without sticking.

It should be noted that the Direct Leach residue, as delivered, had an exceptionally high water content of 31.7% compared to the expected water content of 25% for the commercial plant. If the Direct Leach residues had contained only 25% water then additional water would have been required to make the Base Case agglomerate.

It should also be noted that both drying agents used to prepare the High Sulfur Case had a significant fuel requirement and this had to be taken into account in the experiments involving this feed mix.

The final water contents of the three feed blends are shown in Table 6.

TABLE 6 estimated water contents for each feed blend

| Feed Blend | % Water in Blend |
|---|---|
| Base Case | 28.7 |
| Low Sulfur Case | 21.3 |
| High Sulfur Case | 30.2 |

The actual preparation of the feed for the pilot trials was carried out in a similar way to the above tests but instead using batches of approximately 150 kg of mixed feed agglomerated by rotating a 44 gal drum located on rollers.

During the smelting of the feed blends in an ISAS-MELT™ furnace, oxygen from the lance air is required to burn the elemental sulfur to produce $SO_2$ gas and to convert the PbS, $FeS_2$, ZnS and $Cu_2S$ in the feed to their respective oxides. During the smelting process the metal sulphates ($PbSO_4$, $ZnSO_4$, $CuSO_4$ and Jarosite) are decomposed to generate metal oxides, some oxygen plus $SO_2$ gas.

Following the preliminary test, a total of 10 separate tests were completed which ranged from 1 hour to 3 hours in duration. In general 10 kg batches of the mixed feed, previously weighed in buckets, were distributed over 1 meter lengths of the feed conveyor, and the speed of the conveyor was adjusted to give the desired feed rate (typically 60-65 kg/h of wet feed). Additions of silica or limestone fluxes were weighed out and distributed similarly at a fixed addition rate over each 1 meter length of the conveyor. In one test recycled dust was added to the conveyor at a controlled rate to more closely simulate the commercial process.

The lance tip was then submerged in the slag bath, the feed to the furnace started and the lance flows changed to those required for the smelting of the feed mix. During these present test oxygen stoichiometries of between 100% and 150% of nominal requirements were used.

The temperature of the slag bath was monitored by means of a thermocouple contained in a sheath in contact with the slag bath. The bath temperature was controlled by means of adjustments to the natural gas flow rate and/or the variation in the oxygen enrichment of the lance air.

Samples of the slag for assay purposes were taken at intervals by means of a dip bar lowered to the base of the furnace. The thickness of the slag frozen on the bar gave a good indication of the degree of fluidity of the molten slag. The temperature of the slag could be measured by raising the lance and inserting a temperature probe into the furnace so that it contacted the slag.

At the completion of a smelting test, the feed and was stopped and the lance raised out of the slag bath. The slag was then either tapped out of the furnace by opening the tap hole with a combination of drill and oxy-lance or the furnace accretions were melted down into the bath in preparation for a second trial using the same molten slag bath but with different operating conditions. During the tapping operation the slag temperature was measured (if possible) using a Heraeus temperature probe. In addition, spoon samples of the slag were taken plus a sample of the molten slag was granulated by slowly pouring the molten slag into water.

After the test was completed, the baghouse dust was collected and weighed.

A description of the individual test conditions, including average lance flows, bath temperatures (as shown by furnace thermocouple), final slags and lead fuming rates is given in Table 9. It should be noted that tests were only carried out using the Base Case and High Sulfur feeds.

lance furnace, uncontrollable foaming of the bath did not occur. The present inventors were of the view that uncontrollable foaming was a likely outcome of the process of the present invention prior to conducting the pilot plant work. It will be understood that if combustion of the sulphur content of the feed occurred within the bath (which would be desirable in order to take advantage of the heat generated by the combustion of the sulphur), elemental sulphur would be converted to gaseous sulphur oxide within the bath. This would result in a large increase in volume within the bath which, in turn, was thought to be likely to cause significant and probably uncontrollable foaming of the bath. However, the pilot plant work demonstrated that either no foaming occurred or that a stable foam was generated.

TABLE 9

SUMMARY OF PILOT TEST CONDITIONS

| | Starting Slag | | Feed | | | | Silica | Lime | Dust | Stoich |
|---|---|---|---|---|---|---|---|---|---|---|
| Trial No. | Type | % Pb | Feed Type | Dry kg/h | wet kg/h | Total kg | kg/h | kg/h | wet kg/h | (% of cont) |
| LRS1 | — | — | RHF slag | — | — | — | — | — | — | — |
| LRS2 | RHF + litharge | 32.6 | High S + Char | 40.0 | 61.5 | 30 | 0.0 | 0.0 | 0.0 | 120 |
| LRS3 | LRS2 + CaO | 13.9 | High S + Char | 35.0 | 54.0 | 57 | 0.0 | 2.5 | 0.0 | 115 |
| LRS4 | LRS3 + accretion | 10.4 | High S + Char | 38.0 | 64.0 | 80 | 0.9 | 2.0 | 0.0 | 125 |
| LRS5 | LRS4 + dust | 20.4 | Base + Char | 45.0 | 66.3 | 60 | 1.2 | 3.2 | 0.0 | 100 |
| LRS6 | LRS5 + dust | 18.6 | Base + Char | 45.0 | 66.3 | 60 | 1.2 | 3.2 | 0.0 | 105 |
| LRS7 | LRS6 + dust | 22.5 | Base | 45.0 | 63.2 | 180 | 0.0 | 2.5 | 0.0 | 130 |
| LRS8 | LRS7 + dust | 30.5 | Base | 45.0 | 63.2 | 180 | 1.2 | 3.3 | 0.0 | 130 |
| LRS9a | LRS8 + dust + CaO | 32.2 | Base | 45.0 | 63.2 | 120 | 1.2 | 6.0 | 0.0 | 130 |
| LRS9b | LRS9a | 23.1 | Base | 45.0 | 63.2 | 80 | 1.2 | 6.0 | 0.0 | 150 |
| LRS10a | LRS9b + litharge | 47.6 | Base | 45.0 | 63.2 | 90 | 0.0 | 2.6 | 6.0 | 120 |
| LRS10b | LRS10a | 40.7 | Base | 45.0 | 63.2 | 90 | 0.0 | 2.6 | 6.0 | 130 |

| | Air | Oxygen | $O_2$ | Gas | Temp. | Tap Temp | Fume Rate | | Final Slag | |
|---|---|---|---|---|---|---|---|---|---|---|
| | Nm3/h | Nm3/h | Vol % | Nm3/h | (° C.) | (° C.) | (estimated) | | CaO/SiO2 | SiO2/Fe |
| Trial No. | (Results Averaged over the test run) | | | | | (dip Np) | % of Feed Pb | % Pb | Ratio | Ratio |
| LRS1 | | | | | | | | | | |
| LRS2 | 97.0 | 11.5 | 30.0 | 4.5 | 1270 | — | — | 27.3 | 0.07 | 0.76 |
| LRS3 | 110.0 | 14.0 | 30.0 | 7.0 | 1325 | — | 73.0 | 13.9 | 0.27 | 0.79 |
| LRS4 | 100.0 | 16.0 | 33.0 | 6.5 | 1350 | 1420 | 78.0 | 11.6 | 0.39 | 0.74 |
| LRS5 | 99.6 | 11.3 | 29.0 | 6.2 | 1225 | — | 50.0 | 19.9 | 0.35 | 1.04 |
| LRS6 | 79.0 | 12.2 | 32.0 | 4.5 | 1220 | 1262 | 53.0 | 16.8 | 0.38 | 1.04 |
| LRS7 | 83.0 | 18.0 | 36.0 | 5.0 | 1220 | 1275 | 50.0 | 21.5 | 0.42 | 1.17 |
| LRS8 | 75.0 | 16.0 | 35.0 | 6.0 | 1180 | 1240 | 33.0 | 24.9 | 0.43 | 1.28 |
| LRS9a | 77.3 | 16.7 | 35.0 | 6.0 | 1180 | — | 33.0 | 23.1 | 0.83 | 1.35 |
| LRS9b | 64.0 | 24.5 | 43.0 | 5.0 | 1190 | 12107 | 38.0 | 21.9 | 0.83 | 1.38 |
| LRS10a | 80.3 | 13.0 | 35.0 | 4.0 | 1148 | — | 30.0 | 40.7 | 0.56 | 1.37 |
| LRS10b | 86.3 | 14.1 | 35.0 | 4.0 | 1130 | 1169 | 30.0 | 38.0 | 0.55 | 1.30 |

The pilot plant work set out above demonstrates that the sulphur in the feed material predominantly combusted within the bath, thereby providing significant heating value to the contents of the bath. As a result, the high levels of sulphur in the feed can be used to reduce the amount of fuel (such as natural gas or coal) required to be supplied to the furnace. Indeed, the present inventors believe that there may be some embodiments of the present invention in which the sulphur content of the feed material is sufficiently high to provide all of the fuel value required for operation of the process once continuous processing has been achieved. Even if the sulphur content of the feed material is not sufficiently high to provide all of the fuel value required to operate the furnace, it is believed that the fuel requirements for operating the process of the present invention will be reduced, thereby improving the economics of the process.

Surprisingly, the pilot plant experimental work also showed that when the invention was conducted in a top entry The present invention provides a method for treating solid materials containing lead and elemental sulphur that can produce a slag containing lead. The slag containing lead can be subsequently treated to produce lead metal. The fuel requirements for the process are minimised by taking, advantage of the heat generated during combustion of the elemental sulphur within the furnace and, more preferably, within the bath of molten slag.

By operating the process of some embodiments of the present invention such that the elemental sulphur is combusted within the bath of molten slag, the heat of combustion liberated in converting the elemental sulphur to sulphur dioxide acts as a heat source within the furnace. This can reduce the amount of other fuel required to be supplied to the furnace. Indeed, in some embodiments, it may not be necessary to supply other fuel (such as natural gas or coal) to the furnace.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

What is claimed is:

1. A process of treating a solid material containing lead and elemental sulfur, the process comprising feeding the solid material to a furnace containing a bath of molten slag under conditions such that elemental sulfur burns in the furnace to form sulfur dioxide and lead in the solid material is oxidized and reports to the slag, removing a gas stream containing sulfur dioxide from the furnace, and removing a lead-containing slag from the furnace, wherein the elemental sulfur in the solid material comprises greater than 30% by weight of the solid material.

2. A process as claimed in claim 1 wherein the elemental sulfur in the solid material comprises or from 30 to 60% by weight of the solid material.

3. A process as claimed in claim 2 wherein the elemental sulfur in the solid material comprises from 40 to 60% by weight of the solid material.

4. A process as claimed in claim 2 wherein the elemental sulfur in the solid material comprises or from 45 to 58% by weight of the solid material.

5. A process as claimed in claim 1 wherein the oxygen introduced into the furnace is an amount equivalent to 110% to 130% of the stoichiometric requirements of an oxidation reaction for oxidizing the solid material taking place in the furnace.

6. A process of treating a solid material containing lead and elemental sulfur, the process comprising feeding the solid material to a furnace containing a bath of molten slag under conditions such that elemental sulfur burns in the furnace to form sulfur dioxide and lead in the solid material is oxidized and reports to the slag, removing a gas stream containing sulfur dioxide from the furnace, and removing a lead-containing slag from the furnace, wherein the furnace comprises a top entry submerged lance furnace.

7. A process as claimed in claim 6 further comprising treating a product stream of gas exiting from the furnace, said product stream comprising at least a part of the lead contained in the solid material and at least part of the lead in the product stream of gas is at least partially recovered by a recovery step to obtain recovered lead.

8. A process as claimed in claim 6 wherein the solid material comprises leach residue, a leach residue obtained from a zinc leaching process or a blend of one or more of such each residues with a lead concentrate and/or a lead slag.

9. A process as claimed in claim 6 wherein the solid material further comprises silver in the range of 150 to 30000 ppm.

10. A process as claimed in claim 6 wherein the solid material further comprises moisture in range of 10 to 35% by weight.

11. A process as claimed in claim 6 further comprising addition of one or more fluxes to the furnace.

12. A process as claimed in claim 6 wherein at least a part of the slag containing the oxidized lead is removed from the furnace and subsequently treated to produce lead and/or lead bullion therefrom.

13. A process of treating a solid material containing lead and elemental sulfur, the process comprising feeding the solid material to a furnace containing a bath of molten slag under conditions such that elemental sulfur burns in the furnace to form sulfur dioxide and lead in the solid material is oxidized and reports to the slag, removing a gas stream containing sulfur dioxide from the furnace, and removing a lead-containing slag from the furnace, wherein the process includes introducing an oxygen containing stream into the furnace for oxidation of the solid material.

14. A process as claimed in claim 13 wherein the oxygen introduced into the furnace is an amount equivalent to 100 to 150% of an oxidation reaction for oxidizing the solid material taking place in the furnace.

15. A process as claimed in claim 13 wherein the oxygen introduced into the furnace is an amount equivalent to 110% to 130% of the stoichiometric requirements of an oxidation reaction for oxidizing the solid material taking place in the furnace.

16. A process as claimed in claim 13 wherein the oxygen-containing stream is injected into the slag by an oxygen injecting lance submerged into the furnace.

17. A process as claimed in claim 13 wherein the solid material comprises leach residue, a leach residue obtained from a zinc leaching process or a blend of one or more of such leach residues with a lead concentrate and/or a lead slag.

18. A process as claimed in claim 13 wherein the solid material further comprises silver in the range of 150 to 30000 ppm.

19. A process as claimed in claim 13 wherein the solid material further comprises moisture in range of 10 to 35% by weight.

20. A process as claimed in claim 13 further comprising addition of one or more fluxes to the furnace.

21. A method of treating a solid material containing high levels of elemental sulfur, the method comprising the steps of feeding the solid material to a furnace having a bath of molten slag, the bath of molten slag having a temperature of between 1000° C. and 1350° C., wherein elemental sulfur in the solid material burns in the furnace to form sulfur dioxide and lead in the solid material is oxidized to form oxidized lead compounds that report into the molten slag, removing a gas stream containing sulfur dioxide from the furnace and removing a lead-containing slag from the furnace; wherein an oxygen containing gas is introduced into the furnace and oxygen is introduced into the furnace in an amount equivalent to 100% to 130% of the stoichiometric requirements of an oxidation reaction for oxidizing the solid material taking place in the furnace.

22. A method as claimed in claim 21 wherein the sulfur predominantly burns within the bath.

23. A method of treating a solid material containing high levels of elemental sulfur, the method comprising the steps of feeding the solid material to a furnace having a bath of molten slag, the bath of molten slag having a temperature of between 1000° C. and 1350° C., wherein elemental sulfur in the solid material burns in the bath to form sulfur dioxide and lead in the solid material is oxidized to form oxidized lead compounds that report to the molten slag, removing a gas stream containing sulfur dioxide from the furnace, and removing a lead-containing slag from the furnace, wherein the method includes introducing an oxygen containing stream into the furnace for oxidation of the solid material.

24. A method as claimed in claim 23, wherein the furnace comprises a top entry submerged lance furnace.

\* \* \* \* \*